(12) United States Patent
Lim

(10) Patent No.: US 7,610,041 B2
(45) Date of Patent: Oct. 27, 2009

(54) APPARATUS AND METHOD FOR MANAGING MESSAGES OF A WIRELESS COMMUNICATIONS TERMINAL

(75) Inventor: Ju-Hee Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 11/239,779

(22) Filed: Sep. 29, 2005

(65) Prior Publication Data

US 2006/0068764 A1    Mar. 30, 2006

(30) Foreign Application Priority Data

Sep. 30, 2004    (KR) .................. 10-2004-0078043

(51) Int. Cl.
*H04M 1/725* (2006.01)

(52) U.S. Cl. .............. 455/412.1; 455/412.2; 455/414.1; 370/352

(58) Field of Classification Search .............. 455/412.1, 455/412.2, 414.1; 370/352
See application file for complete search history.

(56) References Cited

U.S. PATENT DOCUMENTS 6,628,936 B1 * 9/2003 Furuya .................... 455/412.1
2002/0156856 A1 * 10/2002 Takahashi ................... 709/206
2004/0235523 A1 * 11/2004 Schrire et al. ............... 455/558
2005/0068939 A1 * 3/2005 Bangor et al. ............... 370/352

FOREIGN PATENT DOCUMENTS

| CN | 1391421 | 1/2003 |
| CN | 1514662 | 7/2004 |
| JP | 2000-082023 | 3/2000 |
| JP | 2001-177624 | 6/2001 |
| JP | 2002-077439 | 3/2002 |
| JP | 2002271595 | 9/2002 |
| JP | 2002-318771 | 10/2002 |
| JP | 2003046675 | 2/2003 |
| KR | 1020050039888 A | 5/2005 |

* cited by examiner

*Primary Examiner*—Sanh D Phu
(74) *Attorney, Agent, or Firm*—Lee, Hong, Degerman, Kang & Waimey

(57) ABSTRACT

A wireless communications terminal and a method for managing messages of a wireless communication terminal includes: generating as a single file comprising a portion of messages stored in a message storage box of the wireless communication terminal; and transmitting the single file to a pre-determined e-mail address.

19 Claims, 2 Drawing Sheets

APPARATUS AND METHOD FOR MANAGING MESSAGES OF A WIRELESS COMMUNICATIONS TERMINAL

CROSS-REFERENCE TO RELATED APPLICATIONS

This application claims the benefit of the Korean Patent Application No. 78043/2004, filed on Sep. 30, 2004, which is hereby incorporated by reference as if fully set forth herein.

FIELD OF THE INVENTION

The present invention relates to a wireless communications terminal and, more particularly, to an apparatus and method for managing messages of a wireless communications terminal capable of improving convenience using a message service and performing backup for a message without using an additional device.

BACKGROUND OF THE INVENTION

In general, a wireless communications terminal is a device with which a user can page or otherwise communicate with another party anytime and anywhere upon control by a mobile switching center (MSC) while traveling in a service area managed by a base station (BS). The terminal allows data communications through symbols, numbers or characters, multimedia communication including images, and voice communications.

A short message service (SMS), the most frequently used supplementary service provided by the terminal, simply and accurately delivers a message with desired content to another party by using symbols, numbers, characters, and diagrams. The SMS is advantageous in that since the SMS occupies a channel for a very short time, it incurs low communication costs, and can accurately transfer the desired content to another party regardless of an off-hook state of the another party by using a non-real time transmission method.

With such advantages, the related art mobile communications terminal can delete short messages stored in a short message storage box according to user selection. Namely, the mobile communications terminal user can select one or more short messages desired for deletion among the short messages stored in the short message storage box and delete them.

In addition, due to a limitation in storage capacity of the short message storage box, the mobile communications terminal can back up (save) the short messages stored in the short message storage box to a Personal Computer (PC) through a Universal Serial Bus (USB) port or a Universal Asynchronous Receiver Transmitter (UART) port.

However, in the related art mobile communications terminal only one short message can be selected at one time from the short messages stored in the short message receiving box and transmitted to the PC. Namely, in order to transmit a plurality of short messages, each short message must be selected each time and then transmitted one at a time, causing inconvenience for transmitting a plurality of short messages.

Besides, in order to perform backup for the short messages stored in the short message storage box to the computer, the USB port or the UART port must be provide and used. Namely, the short messages stored in the short message storage box cannot be backed up without using an additional device such as the USB port or UART port and their related components.

SUMMARY OF THE INVENTION

Therefore, one object of the present invention is to provide an apparatus for managing messages of a mobile communications terminal by generating a single file of at least on message of the messages stored in a message storage box and transmitting an e-mail including the generated single file to a pre-set e-mail address, and its method thereof.

Another object of the present invention is to provide an apparatus for managing messages of a mobile communications terminal by generating a single file containing the at least one message of the messages stored in the message storage box as, and transmitting the single file as an e-mail to a pre-set e-mail address, thereby performing backup for short messages without using an additional device, and its method thereof.

To achieve at least the above objects in whole or in parts, there is provided a method for managing messages of a mobile communications terminal including: generating a single file containing a portion of messages stored in a message storage box of the mobile communications terminal; and transmitting the single file to a pre-set e-mail address.

To achieve at least these advantages in whole or in parts, there is further provided a method for managing messages of a mobile communications terminal including: receiving a message; determining whether the remaining capacity of a message storage box having stored messages is greater than the size of the received message; if the remaining storage capacity of the message storage box is less than the size of the received message, generating a portion of the received messages in the communication terminal as a single file; transmitting the single file with a pre-set address; deleting the portion of stored messages transmitted from the message storage box; and storing the received message in the message storage box.

To achieve the above object, there is also provided an apparatus for managing messages of a mobile communications terminal including: a memory for storing received messages; and a controller for generating a portion of stored messages as a single file, and transmitting the single file to a pre-set e-mail address.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

An apparatus and method for managing messages of a mobile communications terminal by performing message backup without using separate components (such as a USB port or UART port components) by generating a single file containing a plurality of messages stored in a message storage box and transmitting the single file to a pre-set e-mail in accordance with one embodiment of the present invention will now be described with reference to the accompanying drawings.

In the method for managing messages of the mobile communications terminal, the message is a short message, a long message, or a multimedia message.

Figure 1:
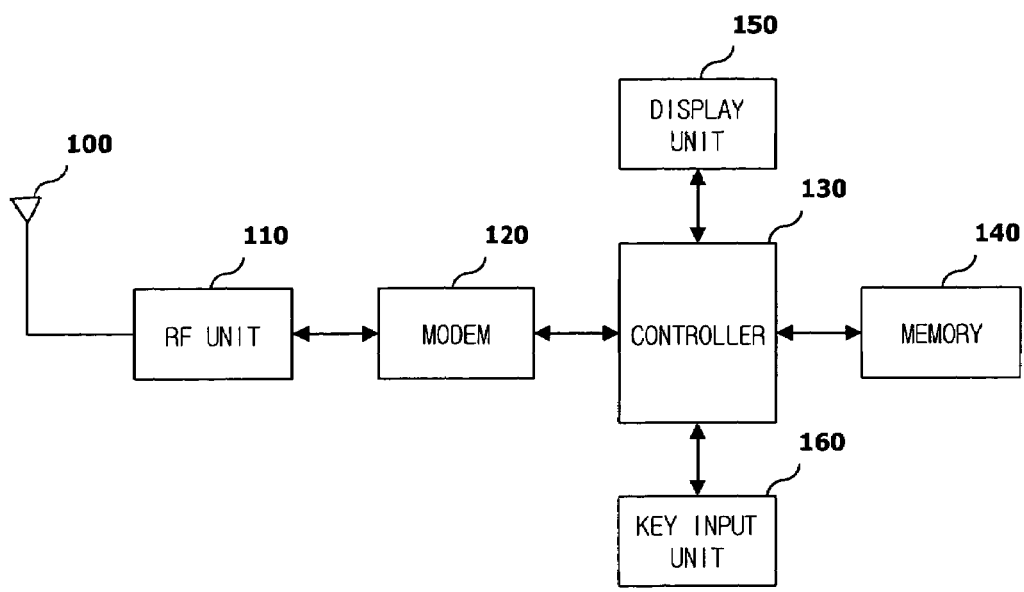
FIG. 1 is an exemplary schematic block diagram showing an apparatus for managing messages of a mobile communications terminal in accordance with the present invention.

FIG. 1 is an exemplary schematic block diagram showing an apparatus for managing messages of a mobile communications terminal in accordance with the present invention.

As shown in FIG. 1, the apparatus for managing messages of a mobile communications terminal comprises: a memory 140 of a fixed capacity for storing received messages; a controller 130 for generating a single file from the plurality of stored messages; a modem 120; a radio frequency (RF) unit 110; an antenna 100 for transmitting the generated single file to an e-mail address; a display unit 150 for displaying the received messages; and a key input unit 160 for receiving the e-mail address.

The method for managing messages of a mobile communications terminal with the above-described construction will now be described with reference to FIG. 2.

Figure 2:
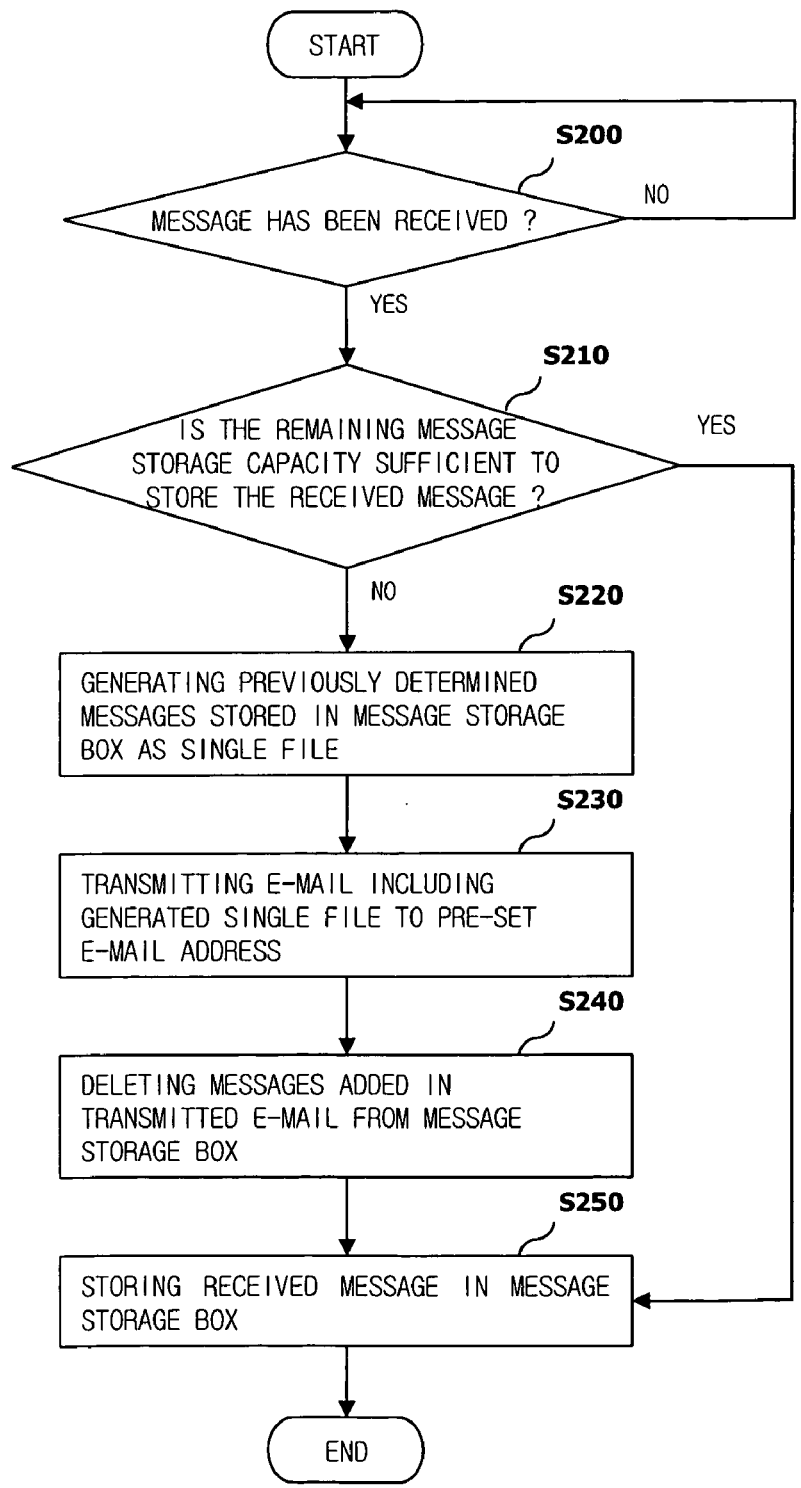
FIG. 2 is an exemplary flow chart of a method for managing messages of the mobile communications terminal in accordance with the present invention.

As shown in FIG. 2, the method for managing messages of a mobile communications terminal comprises: receiving a message (step S200); determining whether the message storage box has remaining capacity to store the received message (step S210); if the remaining capacity is not sufficient to store the received message, generating a single file comprising previously selected messages already stored in the message storage box (step S220); transmitting an e-mail including the generated message to a pre-set e-mail address (step S230); deleting the previously selected messages from the message storage box (step S240); and storing the received message in the message storage box (step S250). If the remaining capacity is sufficient to store the received message, storing the received message in the message storage box (step S250).

The method for managing the message of the mobile communications terminal will now be described in detail with reference to FIG. 1 and FIG. 2.

First, the controller 130 indicates that a message has been received (step S200). If a message is received, the controller 130 determines whether the remaining storage capacity of the message storage box is sufficient for storing the received message (step S210). The controller 110 compares the size of the received message plus the size of the total messages already stored in the message storage box with a maximum capacity of the message storage box. The maximum storage capacity of the message storage box may be determined by the manufacturer of the mobile communications terminal or by the user.

If the remaining capacity the message storage box is less than the received message, the controller generates a single file comprising previously determined messages among the messages stored in the message storage box (step S220). The previously determined messages refer to messages that are selected, for example, according to the order of their storage into the message storage box (i.e., the oldest or most stale messages being selected first). A number of messages is selected such that the aggregate size, when deleted, will allow the storage of the received message. The single file refers to a file comprising the selected messages and the single file has a 'txt' or 'html' file extension.

If the remaining capacity of the message storage box is greater than the size of the received message, the controller 130 stores the received message in the message storage box (step S250).

Thereafter, the controller 130 transmits an e-mail including the generated single file to a pre-set e-mail address (step S230), thereby enabling a user to back up or save the messages that were initially stored in the message storage box. The pre-set e-mail address is preferably an e-mail address for the user of the mobile terminal.

The controller 130 then deletes the selected messages stored in the message storage box thereby freeing memory to store the received message in the message storage box (step S240), and stores the received message in the message storage box (step S250).

By transmitting an e-mail containing a single file having selected messages to an e-mail address and deleting the selected messages, a user not only frees the memory of the message storage box for storing additional messages, but also has received a file containing the deleted messages for saving or for back-up.

The present invention provides a mobile communications terminal apparatus comprising: a transceiver (e.g., the RF unit 110 and the modem 120) to send and receive text or multimedia messages via a mobile communications messaging service; a memory (140) to store the messages; and a controller (130) cooperating with the transceiver and the memory such that one or more stored messages are selected and transferred to an electronic mail server for storage thereof in order to limit the total size of the stored messages in order thereby preventing the capacity of the memory from being exceeded.

Here, the mobile communications messaging service can be a Short Messaging Service or a Multimedia Messaging Service. The controller can automatically select certain stored messages based upon priority criteria for inclusion in the single file. The priority criteria may be a sequential order beginning from the oldest stored message, or may be a sequential order beginning from the least important stored message. The user may also select which messages are to be included in the single file. The controller then can attach the single file of selected messages to an electronic mail message for transmitting to the electronic mail server. The single file of selected messages has a format that allows transferring the single file to the electronic mail server. The electronic mail message can be sent automatically or upon user confirmation after detecting a status of the memory. The detected memory status can indicate that the memory is full or that a certain level of memory capacity has been reached.

As so far described, the apparatus and method for managing messages of a mobile communications terminal in accordance with the present invention have many advantages.

Since a plurality of messages are generated as a single file and the single file is e-mailed to a previously determined e-mail address, the ease of using a Short Messaging Service is increased.

In addition, the short messages stored in the short message storage box can be backed up through a multimedia message service without the necessity of an additional device.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for managing messages of a mobile communications terminal, the method comprising:
   receiving a message via one of a Short Messaging Service (SMS) or Multimedia Messaging Service (MMS); and
   determining whether a message storage box having SMS or MMS messages has remaining capacity to store the received message, wherein if the message storage box has remaining capacity, then storing the received message, else generating a single file comprising at least one of the SMS or MMS messages already stored in the message storage box, attaching the single file to an e-mail message, transmitting the e-mail message including the attached single file to a pre-set e-mail address, deleting the at least one of the SMS or MMS messages from the message storage box, and storing the received message in the message storage box.

2. The method of claim 1, wherein each of the messages is a short message, a long message, or a multimedia message.

3. The method of claim 2, wherein the total size of the at least one message is equal to or greater than the size of the received message.

4. The method of claim 1, wherein a manufacturer of the mobile communication terminal determines the maximum capacity of the memory storage box.

5. The method of claim 1, wherein a user of the mobile communication terminal determines the maximum capacity of the memory storage box.

6. The method of claim 1, wherein the at least one SMS or MMS message is selected from all the messages stored in the message storage box based upon priority criteria.

7. The method of claim 6, wherein the priority criteria depend upon the time the SMS or MMS message was stored in the message storage box.

8. The method of claim 6, wherein the priority criteria depend upon an importance parameter associated with each SMS or MMS message stored in the message storage box.

9. The method of claim 1, wherein the single file has a file format having a file extension of 'txt' or 'html'.

10. The method of claim 1, wherein the pre-set e-mail address is determined by a user of the mobile terminal.

11. A mobile communications terminal apparatus comprising:
    a transceiver to send and receive Short Messaging Service (SMS) or Multimedia Messaging Service (MMS) messages;
    a memory to store the SMS or MMS messages; and
    a controller cooperating with the transceiver and the memory such that at least one of the stored SMS or MMS messages is selected and transferred to and stored by an electronic mail server in order to prevent a capacity of the memory from being exceeded,
    wherein the controller transfers the selected at least one SMS or MMS message by attaching the selected at least one SMS or MMS message to an electronic mail message sent to the electronic mail server.

12. The apparatus of claim 11, wherein the controller selects the at least one SMS or MMS message automatically based upon priority criteria.

13. The apparatus of claim 12, wherein the priority criteria comprise a sequential order based upon the time each SMS or MMS message was stored.

14. The apparatus of claim 12, wherein the priority criteria comprise a sequential order based upon the importance assigned to each stored SMS or MMS message.

15. The apparatus of claim 14, wherein a user assigns the importance of each SMS or MMS message.

16. The apparatus of claim 11, wherein the selected at least one SMS or MMS message is converted into a format that allows transferring to the electronic mail server.

17. The apparatus of claim 11, wherein the electronic mail message is sent upon detecting a status of the memory.

18. The apparatus of claim 17, wherein the detected memory status indicates that the size of the stored messages is equal to or greater than a predetermined portion of the memory's maximum capacity.

19. The apparatus of claim 17, wherein the electronic mail message is sent upon confirmation by the user.

* * * * *